US 9,525,663 B2

(12) United States Patent
Yuan et al.

(10) Patent No.: US 9,525,663 B2
(45) Date of Patent: Dec. 20, 2016

(54) MULTIPLE CPU ARCHITECTURE PLATFORM NETWORK FIREWALL

(71) Applicant: HUAWEI TECHNOLOGIES CO., LTD., Shenzhen, Guangdong (CN)

(72) Inventors: Liang Yuan, Shenzhen (CN); Jacob Lerenius, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 14/094,012

(22) Filed: Dec. 2, 2013

(65) Prior Publication Data

US 2014/0090047 A1 Mar. 27, 2014

Related U.S. Application Data

(63) Continuation of application No. PCT/EP2011/059166, filed on Jun. 2, 2011.

(51) Int. Cl.
*H04L 29/06* (2006.01)
*G06F 1/32* (2006.01)
*H04W 88/02* (2009.01)

(52) U.S. Cl.
CPC ......... *H04L 63/0227* (2013.01); *G06F 1/3209* (2013.01); *G06F 1/3287* (2013.01); *G06F 1/3293* (2013.01); *H04L 63/0263* (2013.01); *H04W 88/02* (2013.01); *Y02B 60/121* (2013.01); *Y02B 60/1282* (2013.01)

(58) Field of Classification Search
CPC ..... G06F 1/3203; G06F 1/3209; G06F 1/3293
See application file for complete search history.

(56) References Cited

U.S. PATENT DOCUMENTS

2010/0056209 A1  3/2010  He et al.

FOREIGN PATENT DOCUMENTS

| CN | 101668350 | 3/2010 |
| EP | 1 317 115 A2 | 6/2003 |
| WO | 99/35557 | 7/1999 |

OTHER PUBLICATIONS

Iwata et al.; Design Concept of an Embedded Data-Driven Firewall Processor; 2004—International Conference on Next Era Information Networking; Retrieved from the Internet <URL: 166.111.64.8/~zhengyouquan/publications/paper20.pdf>; pp. 1-8 as printed.*
Cai et al.; Dynamic Power Management Using Data Buffers; 2004; Retrieved from the Internet <URL: dl.acm.org/citation.cfm?id=969028>; pp. 1-6 as printed.*
(Continued)

*Primary Examiner* — Oleg Korsak
(74) *Attorney, Agent, or Firm* — Staas & Halsey LLP (57) ABSTRACT

A system includes a communication processor and an application processor communicatively coupled to the communication processor. The communication processor is configured to detect a receipt of an incoming data packet, initially process at least a portion of the incoming data packet in the communication processor to determine if the incoming packet satisfies a first set of pre-determined criteria and automatically enable a transfer of the incoming data packet to the application processor depending upon an outcome of the initial processing of the incoming data packet.

25 Claims, 6 Drawing Sheets

(56) References Cited

OTHER PUBLICATIONS

Agarwal et al. (Somniloquy: Augmenting Network Interfaces to Reduce PC Energy Usage, Apr. 22, 2009, NSDI'09 pp. 365-380).*
International Search Report, dated Jun. 3, 2012, in corresponding International Application No. PCT/EP2011/059166 (3 pp.).
International Search Report issued Mar. 6, 2012, in corresponding International Patent Application No. PCT/EP2011/059166.
Wikipedia, "Port (computer networking)", last modified Apr. 29, 2014, http://en.wikipedia.org/wiki/Port_(computer_networking).
Wikipedia, "Internet Protocol", last modified May 8, 2014, http://en.wikipedia.org/wiki/Internet_protocol.
Wikipedia, "Transmission Control Protocol", last modified May 13, 2014, http://en.wikipedia.org/wiki/Transmission_Control_Protocol.
Wikipedia, "User Datagram Protocol", last modified Apr. 27, 2014, http://en.wikipedia.org/wiki/User_Datagram_Protocol.
Chinese Office Action and Search Report dated Apr. 3, 2015 in corresponding Chinese Patent Application No. 201180068333.2.

* cited by examiner

MULTIPLE CPU ARCHITECTURE PLATFORM NETWORK FIREWALL

CROSS-REFERENCE TO RELATED APPLICATIONS

This application is a continuation of International Application No. PCT/EP2011/059166, filed on Jun. 2, 2011, which is hereby incorporated by reference in its entirety.

BACKGROUND

The present disclosure generally relates to communication devices, and more particularly to a firewall implemented on a communication processor of a multiprocessor communication device to control power consumption in communication devices.

In a traditional communication network, such as a mobile communication network, data channel or connection requests would generally be initiated by the client device or handset, also referred to herein as a mobile terminal or device. The active use of a data connection by the device generally consumes power which, in a battery operated mobile device, is an operational factor and concern. Network traffic over the Internet to a mobile device generally involves the processing of the packets that comprise an Internet protocol ("IP") stack, also referred to as a "network" protocol stack.

In a multi-processor system or device, certain communication related operations, such as monitoring control indicators for incoming calls, can be handled by a processing unit or device that is commonly referred to as a baseband or communication processor. Complex operations, such as those required for implementing certain functions and application of a device such as a smart phone, can be handled by general purpose microprocessors, generally referred to as application processors. The application processor can be used to implement functions such as, but not limited to, media playback functions, email display functions, word processing and web browsing functions. The information processing of the IP packets is typically executed in the application processor of the multi-processor device.

IP packets are received on the communication processor side of the mobile device. The packets are forwarded from the communication processor to the application processor for processing and, in some cases, depending on the particular communication protocol of the packet, a response or acknowledgment must be sent back to the network from the application processor via the communication processor. For example, when a packet arrives from the network, such as an incoming mail notification, the communication processor will wake the application processor to process the incoming packet. In the case of unwanted data packets, the response from the application processor can be simply a termination of the IP connection or another action not necessarily needing the attention from the application processor. The processing of the unwanted data by the application processor consumes a significant amount of power, which is a concern with these battery operated mobile devices.

In the past, to conserve battery life of the device, when the data connection was not needed or not active, the connection would be shut down. This minimized the need for the application processor to receive and process unwanted data packets. While turning off the data connection will reduce the processing and associated energy consumption, merely turning off the IP connection is becoming a less desirable option, because by turning off the IP or data connection, many programs will not function properly. For example, with advanced communication services such as push email, a persistent or always active data connection between the device and the Internet is required. The mobile device must be able to persistently receive packets of data from those services in order to notify the mobile device of the existence of new electronic mail messages. The need for push network traffic means that some mobile terminals, most typically smart phones, must continually monitor and receive data traffic related to certain communication related operations, which requires an open data connection. Since the connection is always open by default, numerous amounts of traffic can be received and processed by the mobile device, including unwanted or undesirable traffic.

In the active mode, application processors typically require more power to operate than communication processors. However, when the user of the device is not actively using the device, the application processor is generally not needed. Thus, the application processor can be shut down or placed in a sleep or idle mode to conserve power. In the event that incoming push data is received, the application processor can be powered up to receive and process the incoming data. This type of traffic is typically processed through a firewall in the application processor of the device. In the case of unwanted data, this can require unnecessary operation of the application processor and undesirable power consumption, even without the user's knowledge or benefit.

It would be advantageous to minimize device battery consumption in a communication device even when the data connection is persistently active or enabled. It would also be advantageous to minimize use of the application processor in a multi-processor device for providing push network services.

Accordingly, it would be desirable to provide a system that addresses at least some of the problems identified.

SUMMARY

As described herein, the exemplary embodiments overcome one or more of the above or other disadvantages known in the art.

One aspect of the exemplary embodiments relates to a system. In one embodiment, the system includes a communication processor and an application processor communicatively coupled to the communication processor. The communication processor is configured to detect a receipt of an incoming data packet, initially process at least a portion of the incoming data packet in the communication processor to determine if the incoming packet satisfies a first set of pre-determined criteria, and automatically enable a transfer of the incoming data packet to the application processor depending upon an outcome of the initial processing of the incoming data packet.

In another aspect, the disclosed embodiments are directed to a method. In one embodiment, the method includes detecting a receipt of an incoming data packet in a multi-processor communication device, the multi-processor device including at least a communication processor and an application processor, initially processing at least a portion of the incoming data packet in the communication processor to determine if the incoming packet satisfies a first set of pre-determined criteria, and enabling a transfer of the incoming data packet to the application processor depending upon an outcome of the initial processing.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS

Figure 1:
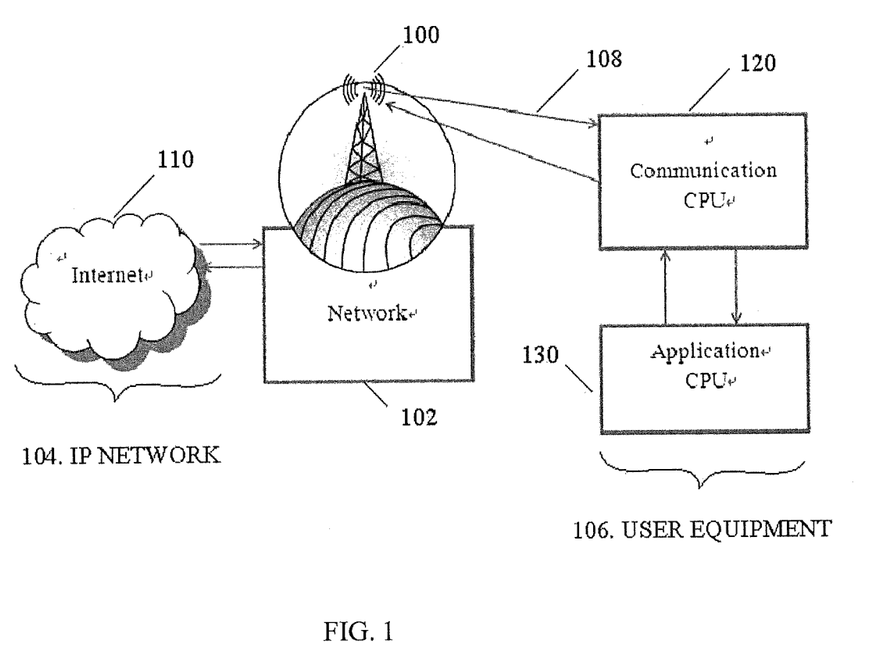
FIG. 1 is a block diagram of an exemplary communication system incorporating aspects of the disclosed embodiments.

Referring to FIG. 1, an exemplary communication system incorporating aspects of the disclosed embodiments is generally designated by reference numeral 100. As shown in FIG. 1, the communication system 100 generally includes a core communication network or system 102 that is configured to be in communication with an information and data network 104, such as the Internet, and a user equipment or device 106. In one embodiment, the network 102 is a wireless communication system, such as a cellular telephone network, wireless local area network or Wi-Fi network, for example. A data connection 108, as is further described herein, is configured to enable communication between the core network 102 and the user equipment 106. The user equipment or device 106 can comprise a wireless or Wi-Fi enabled device, such as a mobile communication device, cellular communication device. Examples of such devices can include, but are not limited to, personal computing devices, notebooks and notepads, smartphones, cellular telephones, video game consoles, or digital audio and video players. Although the exemplary embodiments will be described herein with respect to a single user equipment 106, it will be understood that in alternate embodiments, the network 102 can be configured to be coupled to, and in communication with, any number of user equipment devices 106, at substantially the same time. The aspects of the disclosed embodiments are generally directed to minimizing power consumption is such user equipment 106 even when the data connection 108 is persistently active.

Figure 2:
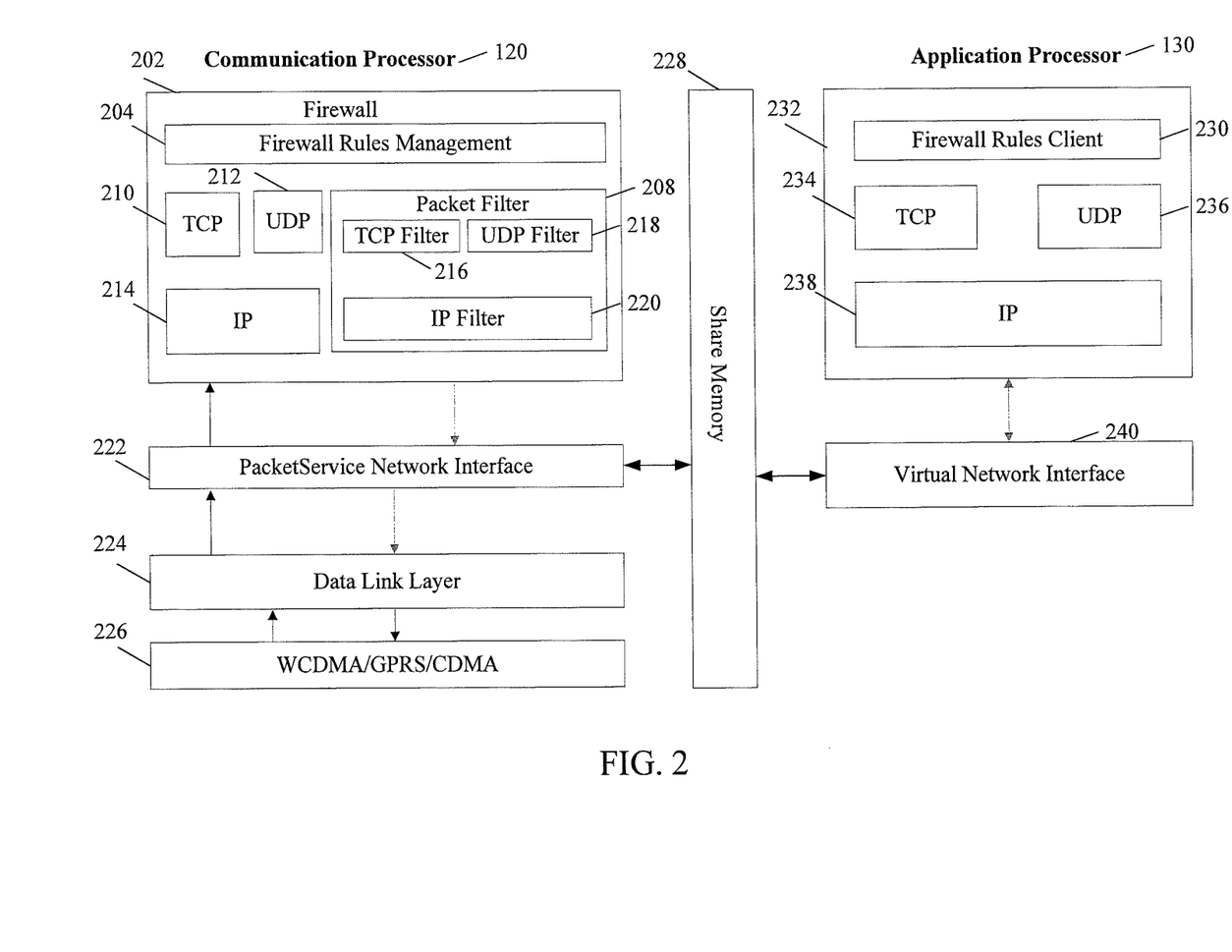
FIG. 2 is a block diagram of an exemplary user equipment incorporating aspects of the disclosed embodiments.

The aspects of the disclosed embodiments provide a mirrored network policy that includes a firewall stored on the communication processor 120. FIG. 2 illustrates one embodiment of the network policy structure of the communication processor 120 and the application processor 130. By providing a mirrored network policy on the communication processor 120, unwanted network traffic can be filtered at an early stage of the processing without the need for the application processor 130 to be woken or activated to handle the data. If the application processor 130 remains in an inactive or idle state, a significant amount of power is conserved. The time spent handing the data is also significantly reduced.

The filtering on the communication processor 120 is done by introducing a network stack and a transport stack containing a firewall 202 as is shown in FIG. 2. The firewall 202 implemented on the communication processor 120 can include packet filtering, port filtering and/or packet content filtering. In one embodiment, the firewall 202 generally comprises a firewall rules management module 204, a network stack module 206 and a packet filter module 208. The network stack module 206 generally comprises a transmission control protocol module 210, a user datagram protocol module 212 and an Internet protocol module 214, as those are generally understood in the art. The packet filter module 208 generally includes a transmission control protocol filter module 216, a user datagram protocol filter module 218 and an Internet protocol filter module 220.

The application processor 130 includes a firewall rules client module 230 and a network stack module 232. The network stack module 232, which can also be referred to as an Internet protocol suite, includes a transmission control protocol module 234, a user datagram protocol module 236 and an Internet protocol module 238, as those are generally understood in the art.

In one embodiment, the communication processor 120 can also include a packet service network interface module 222, a data link layer module 224 and a WCDMA/GPRS/CDMA module 226. A shared memory 228 can be used to transfer information and data to and between the communication processor 120 and the application processor 130. In alternate embodiments the communication processor 120 may communicate with the application processor 130 using any suitable interface, including for example, a universal serial bus or other proprietary interface.

In one embodiment, the application processor 130 can include a virtual network interface 240 to facilitate the exchange and transfer of the information and data.

Figure 3:
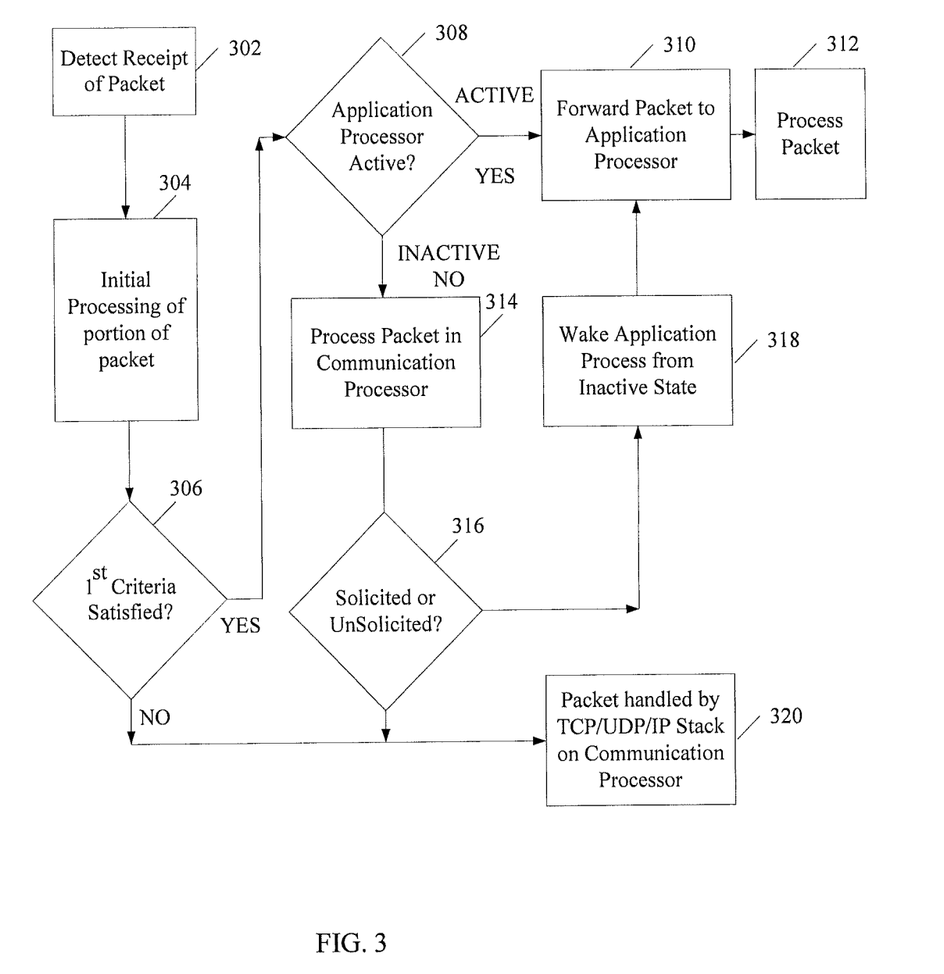
FIG. 3 is a flow chart illustrating an exemplary process incorporating aspects of the disclosed embodiments.

The aspects of the disclosed embodiments generally provide two basic services in the communication processor 120, including packet filtering and firewall rules management. FIG. 3 is a flowchart illustrating an exemplary process flow incorporating aspects of the disclosed embodiments. Referring to FIGS. 2 and 3, the communication processor 120 detects and/or receives 302 an incoming network packet, also referred to herein as a "packet." As will be generally understood, a packet can include a formatted unit or block of data carried by a packet mode computer network. The term "packets" as is used herein will also include datagrams, as is applicable. In one embodiment, the communication processor 120 is configured to process 304 at least a portion of the incoming packet according to a first pre-determined criteria. A determination 306 is made as to whether the packet satisfies the first pre-determined criteria. In one embodiment, the pre-determined criteria can include for example, general firewall processing such as extracting source/destination IP addresses, port and protocol information of the incoming packet or if the packet passes certain packet filter rules. The packet filter rules can be established in any suitable manner. Depending on the outcome of this determination, the communication processor 120 can automatically enable the incoming data packet to be forwarded 310 to the application processor 130 for processing 312. The communication processor 120 is configured to be able to process the incoming data packet without waking, or changing a state of the application processor 130.

In one embodiment, if the first criteria is not satisfied, the packet can be processed 320 in the packet filter and/or network protocol stack of the communication processor. If the first criteria is satisfied a determination 308 is made as to whether or not a state of the application processor is active or inactive. In one embodiment, the firewall 202 on the communication processor 120 will determine 308 if a state or status of the application processor 130 is active or idle. In alternate embodiments, any suitable process can be used to determine 308 the state of the application processor 130, including for example, monitoring a status indicator of the application processor 130. In the active state, the application processor 130 is powered on and is processing, or is ready to process data, which in this example could be the received packet. If the state of the application processor 130 is determined to be active, the packet is forwarded 310 to the application processor 130 for processing. In one embodiment, the packet is forwarded 310 from the communication processor 120, or a memory location associated with the communication processor 120, to the application processor 130. In one embodiment, as is shown in FIG. 2, the communication processor 120 communicates with the application processor 130 via the shared memory 228.

If the state of the application processor 130 is determined 308 to be inactive or idle, in one embodiment, the firewall 202 in the communication processor 120 processes 314 the received packet according to a second set of pre-determined criteria. In one embodiment, the packet is processed 314 in the packet filter 208 of the firewall 202 of the communication processor 120. The processing 314 of the packet by the packet filter 208 can include processing the packet according to rules set in the TCP Firewall Filter 216, UDP Firewall Filter 218 and IP firewall filter 220. For example, in one embodiment, the packet filter 208 extracts the source/destination IP addresses, the source/destination port and protocol information associated with the packet, and uses this information to process the packet according to the firewall rules.

A determination 316 is made as to whether the packet passes the IP Firewall Rules, as can be defined in the Firewall Rules Management module 204. If the packet fails to pass the IP Firewall Rules, which rules can be set or established by the application processor 130, the packet is determined 316 to be an unsolicited packet. The unsolicited packet will then be handled 320 by the network protocol stack 206 on the communication processor 120, without waking the application processor 130, in a manner as will generally be understood.

If the packet passes the IP Firewall Rules, the packet is determined 316 to be a solicited packet. In the case of the application processor 130 being in the inactive or sleep state, the state of the application processor is enabled to be changed 318 to an active state. The packet is then forwarded 310 to the application processor 130. The processor 130 then processes 312 the packet according to the rules established in the firewall rules client 230 and the TCP/UDP/IP protocol stack 234-238. In one embodiment, a virtual network interface 240 communicates with the memory 228 for enabling communication and the transfer of data and information between the communication processor 120 and the application processor 130. The virtual network interface 240 can comprise a modem network interface emulated as an Ethernet network interface communicatively coupled between the shared memory device 228 and the application processor device 130. In alternate embodiments, any suitable interface can be utilized to enable communication and the transfer of data and information to and between the communication processor 120 and the application processor 130.

The Firewall Rules Management module 204 can be used to establish and implement rules as established by the application processor 130. For example, to create firewall rules, in one embodiment, when an application being executed by the application processor 130 establishes a network or data connection, or listens on a port, the Firewall Rules Client module 230 will send a data connection request that includes the port number and the protocol type to the Firewall Rules Management module 204 on the communication processor 120. The Firewall Rules Management module 204 will create a firewall rule(s), and apply the new rule(s). In one embodiment, the rules for the firewall can be configured by the application processor 130, changed by the application processor 130 at run time, set by either the application processor 130 or communication processor 120 at boot time, hard coded in executable, or provided in a file or table for lookup. The file or table for lookup could be provided in the user equipment 106 or be set by an external party, such as an operator, for example.

In order to remove a firewall rule(s), if an application is not listening to a port, or the connection is closed, the Firewall Rules Client 230 will send a request that includes the port number and protocol type to the Firewall Rules Management module 204. The Firewall Rules Management module 204 removes the related firewall rules(s) and applies the new rule(s).

Figure 4A:
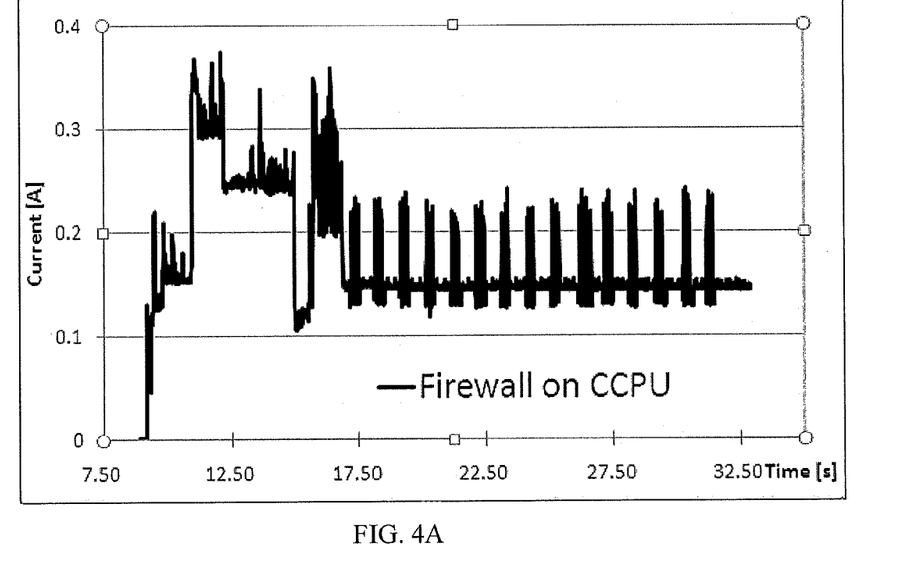
FIGS. 4A-4C represent exemplary current profiles for a communication processor and application processor in a system incorporating aspects of the disclosed embodiments.
Figure 4B:
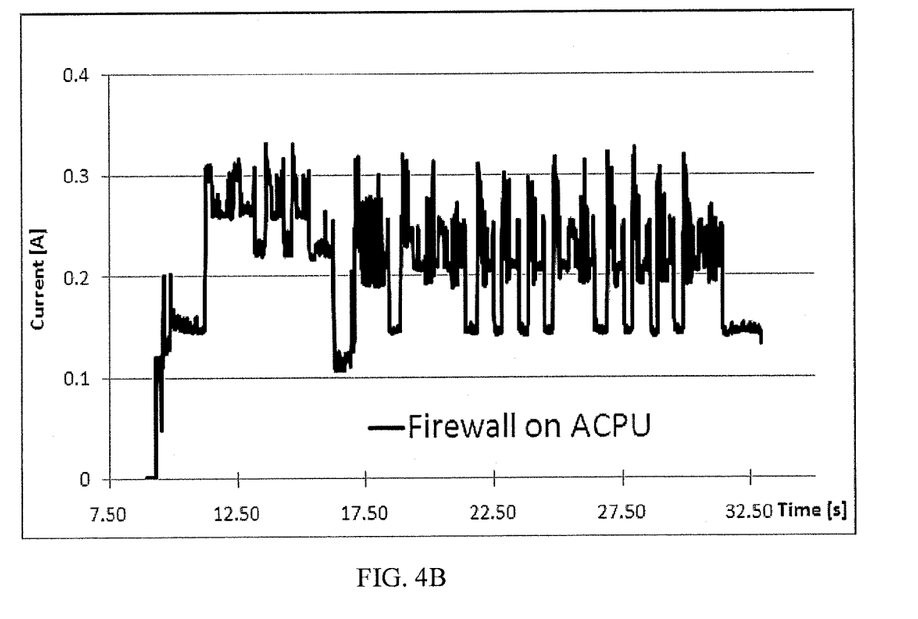
Figure 4C:
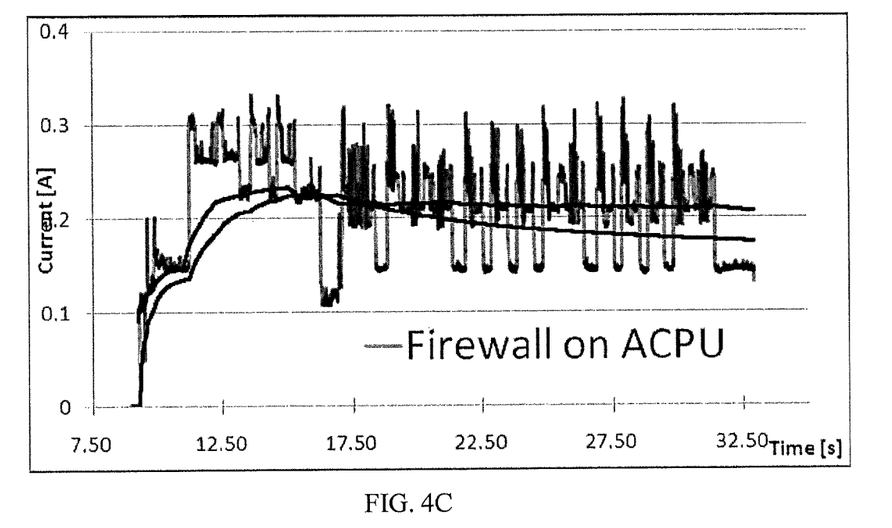

FIGS. 4A-4C are graphs illustrating power consumption performance in a system incorporating aspects of the disclosed embodiments. In FIG. 4A, the current profile line 410 corresponds to the power consumption of the firewall on the communication processor 120 during 15 ping requests from the Internet 110. In FIG. 4B, the current profile line 420 illustrates the power consumption of the device 106. FIG. 4C compares the current profile of a device 106 incorporating an application processor 130 of the disclosed embodiments, as represented by line 440, versus a device that is not using such an application processor, as represented by line 430. As is shown in this example, the power consumption is decreased by approximately 36 mA RMS during the time of receiving the packets. During this time, the application processor 130 is not active.

Referring again to FIG. 1, in one embodiment, the user equipment 106 may be capable of operating in accordance with any of a number of communication protocols. Examples of these protocols can include, but are not limited to, second generation (2G) communication protocols IS-136, time division multiple access (TDMA), global system for mobile communication (GSM), IS-95 code division multiple access (CDMA), third generation (3G) communication protocols, such as Universal Mobile Telecommunications System (UMTS), CDMA2000, wideband CDMA (WCDMA), time division-synchronous CDMA (TD-SCDMA), 3.9 generation (3.9G) wireless communication protocols, such as Evolved Universal Terrestrial Radio Access Network (E-UTRAN) or wireless communication projects, such as long term evolution (LTE) or fourth generation (4G) communication protocols. The aspects of the disclosed embodiments are not intended to be limited by the particular communication protocol used.

In one embodiment, the user equipment 106 may be capable of operating in accordance with a non-cellular communication protocol or environment. For example, the user equipment 106 may be capable of communication in a wireless local area network (WLAN). The user equipment 106 may also be configured to communicate in accordance with techniques, such as radio frequency (RF), infrared (IrDA), any of a number of WLAN techniques. For example, the user equipment 106 may communicate using one or more of the following WLAN techniques: IEEE 802.11, e.g., 802.11a, 802.11b, 802.11g or 802.11n. The user equipment 106 may also communicate, via a world interoperability, to use a microwave access (WiMAX) technique, such as IEEE 802.16, and/or a wireless personal area network (WPAN) technique, such as IEEE 802.15, BlueTooth (BT), or ultra wideband (UWB).

It should be understood that the communications protocols described above may use signals. The signals may comprise signaling information in accordance with the air interface standard of the applicable cellular system, user speech, received data, user generated data, and/or the like. In one embodiment, the user equipment 106 may be capable of operating with one or more air interface standards, communication protocols, modulation types, or access types.

Although the aspects of the disclosed embodiments are generally described with respect to TCP, UDP and IP layer protocols, other transport layer protocols that can be handled by the firewall 202 implemented on the communication processor 120 can include, but are not limited to ATP, CUDP, DCCP, PCP, IL, NBF, SCTP, SPX, SST, UDP Lite, μTP, or other network protocols where TCP and UDP are the most common protocols that generate the problems solved by the disclosed embodiments.

Figure 5:
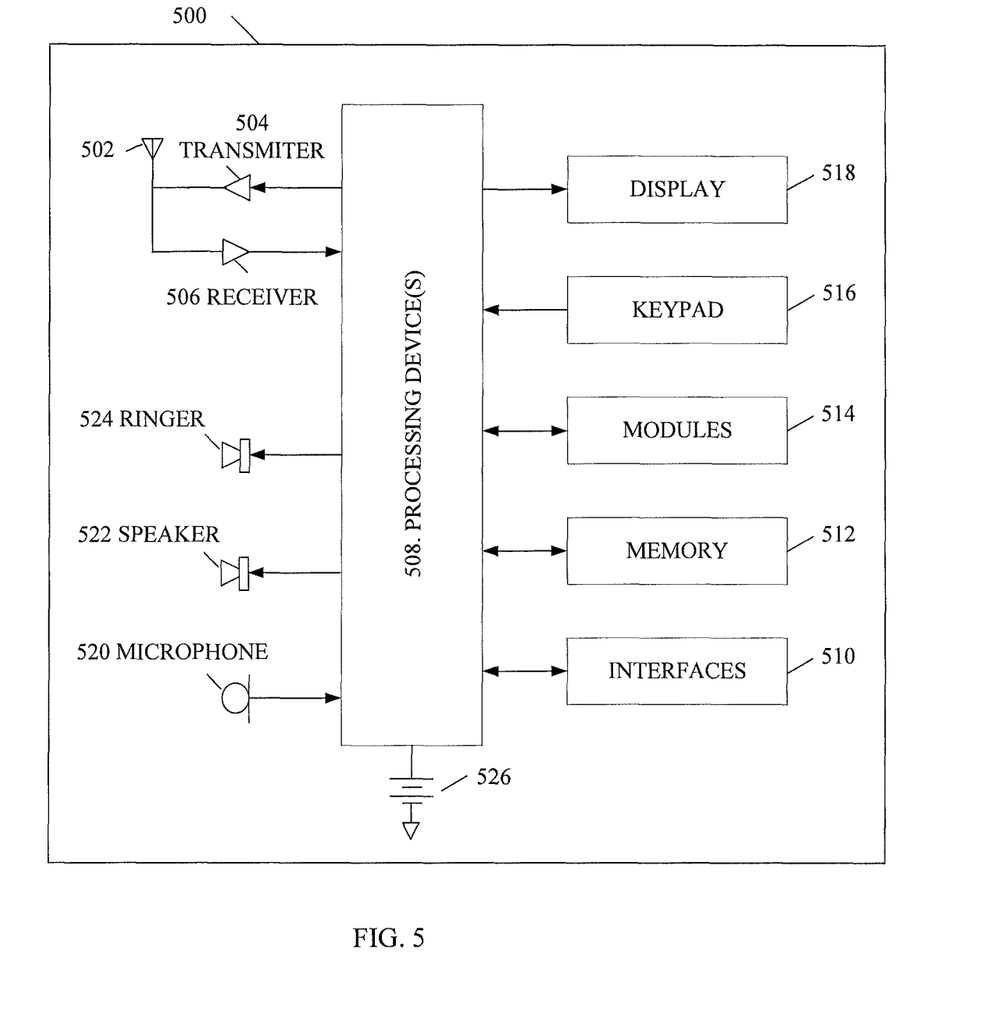
FIG. 5 is a block diagram of an exemplary device that can be used to practice aspects of the disclosed embodiments.

FIG. 5 illustrates a block diagram of a user equipment 106 comprising an electronic device 500 that can be used to implement aspects of the disclosed embodiments. In this exemplary embodiment, the device 500 includes at least one antenna 502 in communication with a transmitter 504 and a receiver 506. The electronic device 500 may further comprise a processing device(s) or processor(s) 508, or other processing component. In one embodiment, instead of a single processor for handling all functions of the electronic device 500, the processor 508 comprises a multi-core processor that allows each individual core to provide specific processing functions, including communication and application specific functions. In one embodiment, the processor 508 comprises the communication processor 120 and application processor 130 illustrated in FIGS. 2 and 3.

The processor 508 may provide at least one signal to the transmitter 504 and may receive at least one signal from the receiver 506 in a suitable fashion. The processor 508 may include one or more devices configured to execute instructions. In at least one embodiment, the execution of computer readable program code (e.g., groups of computer-executable instructions stored in a memory) by processor 508 may cause the device 500 to perform the processes generally described herein including, for example, method steps that may result in data, events or other output activities. The processor 508 may be a dedicated (e.g., monolithic) microprocessor device, or may be part of a composite device such as an ASIC, gate array, multi-chip module (MCM), etc.

The processor 508 may be electronically coupled to other functional components in the device 500 via a wired or wireless bus. For example, processor 508 may access memory 512 in order to obtain stored information (e.g., program code, data, etc.) for use during processing. The memory 512 may generally include removable or imbedded memories that operate in a static or dynamic mode. Further, memory 512 may include read only memories (ROM), random access memories (RAM), and rewritable memories such as Flash, EPROM, etc. Computer readable program code may include any interpreted or compiled computer language including computer-executable instructions. The electronic device 500 may also comprise one or more memory devices 512, which can be part of the electronic device 500 or remotely coupled to the electronic device 500 and processor 508.

The electronic device 500 can include one or more interfaces 510 that may also be coupled to various components in the electronic device 500. These interfaces 510 may allow for inter-apparatus communication (e.g., a software or protocol interface), apparatus-to-apparatus communication (e.g., a wired or wireless communication interface) and even apparatus to user communication (e.g., a user interface). These interfaces 510 generally allow components within electronic device 500, other apparatuses and users, to interact with the electronic device 500. Further, interfaces 510 may communicate machine-readable data, such as electronic, magnetic or optical signals embodied on a computer readable medium, or may translate the actions of users into activity that may be understood by the electronic device 500 (e.g., typing on a keyboard 516, speaking into the microphone 520 of a cellular handset or touching an icon on a touch screen display or device 518.) Interfaces 510 may further allow processor 508 and/or memory 512 to interact with other modules 514. For example, other modules 514 may comprise one or more components supporting more specialized functionality provided by the electronic device 500, including for example, the firewall rule management, network stack and packet filtering functionality.

In an embodiment, the electronic device 500 may also comprise a user interface comprising one or more input or output devices, such as a conventional earphone or speaker 522, a ringer 524, a microphone 520, and a display 518. In one embodiment, the one or more output devices of the user interface may be coupled to the processor 508.

In an embodiment, the electronic device 500 may also comprise a power source 526, such as a battery, for powering various circuits to operate the electronic device 500.

The processor 508 of the electronic device 500 may comprise circuitry for implementing audio feature, logic features, and/or the like. For example, the processor 508 may comprise one or more digital signal processor devices, microprocessor devices, digital to analog converters, or other support circuits. The control and signal processing features of the processor 508 as generally referred to herein may be allocated between devices, such as the communication processor 120 and application processor 130 devices described above, according to their respective capabilities. Further, the processor 508 may also comprise an internal voice coder and/or an internal data modem. Further still, the processor 508 may comprise features to operate one or more software programs and execute the processes generally described herein. For example, the processor 508 may be capable of operating a software program for connectivity, such as a conventional Internet browser. Further, the connectivity program may allow the electronic device 500 to transmit and receive Internet content, such as location-based content, or other web page content. In an embodiment, the electronic device 500 may use a wireless application protocol (WAP), hypertext transfer protocol (HTTP), file transfer protocol (FTP), or other such similar data transfer protocols to transmit and/or receive the Internet content.

The aspects of the disclosed embodiments reduce power consumption in a communication device by providing a mirrored network policy that is stored on the communication processor of a device that includes an application processor and a communications processor. A firewall is implemented on the communication processor that uses rules from the application processor, or another separate processor, where the firewall includes packet filtering, port filtering and/or packet content filtering. To minimize energy consumption, the application processor is typically idled or inactive when not used. Unwanted data traffic can be filtered at an early stage without the need for the communication processor to wake the application processor to handle the data. The filtering is carried out by introducing a network stack and a transport stack containing a firewall on the communication processor portion of the device. Since the application processor does not need to awaken to handle this data, a significant amount of power is conserved, and the time spent handling the data traffic or request is also significantly reduced, which also improves total performance.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system, comprising:
   a communication processor; and
   an application processor communicatively coupled to the communication processor;
   wherein the communication processor is configured to:
      detect a receipt of a data packet;
      execute an initial filter process of at least a portion of the data packet to determine whether the data packet satisfies a first criteria, the initial filter process being executed even while the application processor is in one of an inactive state and an idle state;
      determine, according to the determining of whether the data packet satisfies the first criteria, whether to transfer the data packet to the application processor, the data packet being transferred to the application processor when the data packet satisfies the first criteria as a result of the initial filter process while the application processor is in an active state; and
      execute an additional filter process of the at least the portion of the data packet subsequent to the initial filter process, and
   wherein the additional filter process is executed when determining the first criteria is unsatisfied as the result of the initial filter process, or when the data packet satisfies the first criteria as the result of the initial filter process while the application processor is in one of the inactive state and the idle state, and the additional filter process is executed while the application processor remains in one of the inactive state and the idle state subsequent to the initial filter process.

2. The system according to claim 1, wherein prior to the data packet being transferred to the application processor, determining, by the communication processor, a state of the application processor and processing the data packet in the communication processor according to a second criteria through the additional filter process without changing a state of the application processor.

3. The system according to claim 2, wherein the communication processor is configured to determine whether the data packet is a solicited or unsolicited data packet according to the second criteria, and process the data packet in the communication processor upon the data packet being an unsolicited data packet.

4. The system according to claim 3, wherein the communication processor is configured to enable a change in state of the application processor to active, and enable a forwarding of the data packet to the application processor for processing upon the data packet being a solicited data packet and the state of the application processor being inactive.

5. The system according to claim 3, wherein the communication processor is configured to enable transfer of the data packet to the application processor for processing upon the data packet being a solicited data packet and the state of the application processor being active.

6. The system according to claim 5, wherein the communication processor is configured to enable an activation of the application processor and automatically enable the transfer of the data packet to the application processor for processing upon determining the data packet is a solicited packet and the state of the application processor is inactive.

7. The system of claim 1, wherein the communication processor comprises:
   a firewall including a packet filter module configured to determine whether the data packet satisfies the first criteria and transfer the data packet to the application processor for processing upon satisfaction of the first criteria.

8. The system of claim 7, wherein the packet filter module comprises:
   a transmission control protocol filter module, a user datagram protocol filter module and an Internet protocol filter module.

9. The system of claim 7, wherein the communication processor comprises:
   a network protocol stack module configured to receive and process the data packet from the packet filter module without a change of a state of the application processor to active when the first criteria is not satisfied.

10. The system of claim 9, wherein the network protocol stack comprises a TCP/UDP/IP stack module.

11. The system of claim 1, further comprising:
    a firewall in the communication processor, the firewall configured to automatically process the data packet when the application processor is in the inactive state.

12. The system of claim 11, wherein the firewall comprises a packet filter module.

13. The system of claim 1 further comprising:
    a data communicator coupled to the communication processor, the data connection being in a persistently active state.

14. The system of claim 1, wherein the system further comprises: a mobile communication device.

15. A method, comprising:
    detecting a receipt of a data packet in a multi-processor communication device, the multi-processor device including at least a communication processor and an application processor;
    executing an initial filter processing of at least a portion of the data packet in the communication processor to determine whether the data packet satisfies a first criteria, the initial filter processing being executed even while the application processor is in one of an inactive state and an idle state;

determining, according to the determining of whether the data packet satisfies the first criteria, whether to transfer the data packet to the application processor, the data packet being transferred to the application processor when the data packet satisfies the first criteria as a result of the initial filter processing while the application processor is in an active state; and executing an additional filter processing of the at least the portion of the data packet subsequent to the initial filter processing, and wherein the additional filter processing is executed when determining the first criteria is unsatisfied as the result of the initial filter processing, or when the data packet satisfies the first criteria as the result of the initial filter processing while the application processor is in one of the inactive state and the idle state, and the additional filter processing is executed while the application processor remains in one of the inactive state and the idle state subsequent to the initial filter processing.

16. The method of claim 15, wherein prior to the data packet being transferred to the application processor, determining a state an application processor; and processing the data packet in the communication processor according to a second criteria through the additional filter process without changing a state of the application processor.

17. The method of claim 16, wherein the initial filter processing of the data packet in the communication processor comprises determining whether the data packet is an unsolicited packet or a solicited packet.

18. The method of claim 15, wherein the initial filter processing of the data packet in the communication processor comprises automatically enabling a processing of the data packet by a network protocol stack module in the communication processor upon determining the first criteria is not satisfied.

19. The method of claim 15 further comprising automatically enabling a change of state of the application processor to an active state when the data packet is transferred to the application processor.

20. The method of claim 15, wherein the determining of whether the data packet satisfies the first criteria comprises processing the data packet in a packet filter module of the communication processor.

21. The method of claim 20 wherein the determining of whether the data packet satisfies the first criteria includes processing the data packet in a transmission control protocol filter module, a user datagram protocol filter module or an Internet protocol filter module of the packet filter module.

22. The method of claim 15 further comprising automatically enabling an inactive state of the application processor when a data connection for receiving data packets is persistently active.

23. The method of claim 15, wherein the initial filter processing of at least a portion of the data packet in the communication processor is implemented in a firewall in the communication processor.

24. The method of claim 23, wherein rules for the firewall are configured by the application processor, changed by the application processor at run-time, set by either the communication processor or the application processor at boot time, hard coded in executable code, or provided in a file or table for look-up.

25. A non-transitory computer-readable medium storing a program for executing the method according to claim 15.

* * * * *